UNITED STATES PATENT OFFICE.

AUGUSTUS WARREN GOULD, OF SEATTLE, WASHINGTON.

CONCRETE AGGREGATE AND PROCESS OF PREPARING THE SAME.

1,268,236. Specification of Letters Patent. Patented June 4, 1918.

No Drawing. Application filed January 21, 1918. Serial No. 213,037.

*To all whom it may concern:*

Be it known that I, AUGUSTUS WARREN GOULD, a citizen of the United States, and resident of the city of Seattle, county of King, and State of Washington, have invented certain new and useful Improvements in Concrete Aggregate and Processes of Preparing the Same, of which the following is a specification.

My invention relates to a process or method of treating a natural mineral product to better adapt it for use as a structural or building material and to the product resulting from such treatment.

The material to which I apply this process for the production of the product is a natural rock of a peculiar character which appears to be best classified as an andesitic tufaceous breccia. Large bodies of this are found in the vicinity of Mt. Angel, Oregon. This in its natural state is light in weight, quite cellular in structure and yet impervious to water. It is, however, somewhat deficient in strength and hardness, and it is one of the chief objects of my treatment to increase its strength and hardness and thus adapt it to many purposes to which it would not otherwise be well suited.

I subject this material to a high temperature, or in other words, heat it, until there occurs a certain degree of vitrification. The natural or original appearance of this material is somewhat mottled, with a grayish effect. After it has been heated the color becomes more uniform and darker, becoming a dark reddish or reddish brown. This color will, of course, be affected and largely determined by the kinds of materials, particularly the pigments found in it. The color is not the essential thing or a characteristic test.

This material when so treated becomes much harder in texture, stronger and more resistant to crushing and bending, retains its lightness and imperviousness and as a material for structural purposes is far superior to the original material.

In preparing this material for making concrete, I first crush it to the sizes desired before heating, and heat both the fine and the coarse material. The crushing may be so regulated that the finest particles may be used as a substitute for sand and the proportions of the various sizes be such as to thoroughly fill all the voids. In such case it will only be necessary to add cement and water.

I find that this material so treated becomes an excellent material from which to make concrete and that the concrete made therefrom possesses special advantages over other concretes. In strength it is practically the same as that of concrete made from gravel and it does not weigh more than 75% as much. It is impervious to water, and particularly so if some of this material, finely crushed and ground, be mixed with the cement. After heating, it has a certain measure of cementitious action which is not possessed by the materials most commonly used as aggregates. It is especially adapted for all purposes where lightness is desired.

I find it best to crush the material before heating, as the heating seems to fuse and bind together the parts of pieces in which minute fractures have been found but in which separation has not occurred.

What I claim as my invention is:

1. The method of treating an andesitic tufaceous breccia for use as an aggregate, which consists in crushing and then sintering it.

2. An aggregate for use in making concrete consisting of a sintered, andesitic tufaceous breccia.

Signed at Seattle, Washington, this 15th day of January, 1918.

AUGUSTUS WARREN GOULD.